June 11, 1940.   E. H. THORESEN   2,204,263
MEANS FOR MANUFACTURING ORNAMENTAL CORNER PIECES
Filed Nov. 10, 1937   4 Sheets-Sheet 1

Inventor
Edwin H. Thoresen
by Albert Scheible
Atty.

June 11, 1940.  E. H. THORESEN  2,204,263
MEANS FOR MANUFACTURING ORNAMENTAL CORNER PIECES
Filed Nov. 10, 1937  4 Sheets-Sheet 2
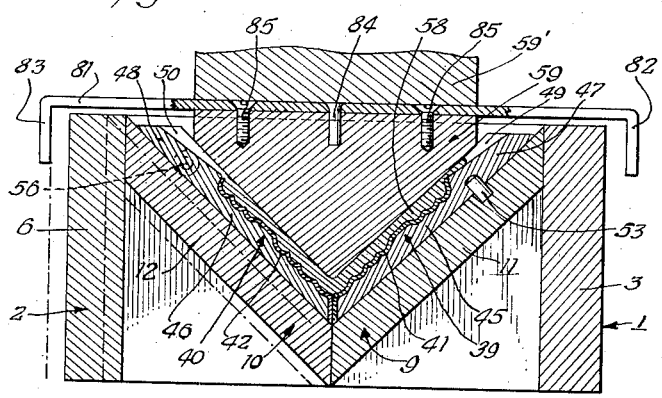
Inventor
Edwin H. Thoresen
by Albert Scheible
Atty.

June 11, 1940.  E. H. THORESEN  2,204,263
MEANS FOR MANUFACTURING ORNAMENTAL CORNER PIECES
Filed Nov. 10, 1937  4 Sheets—Sheet 3
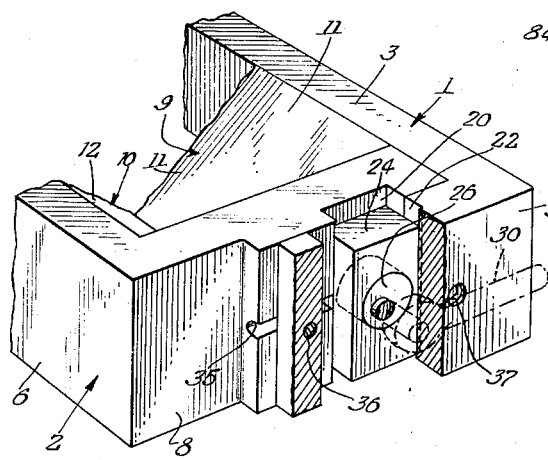
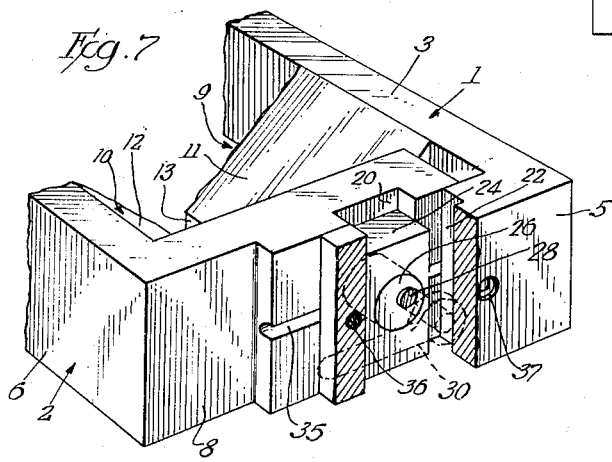
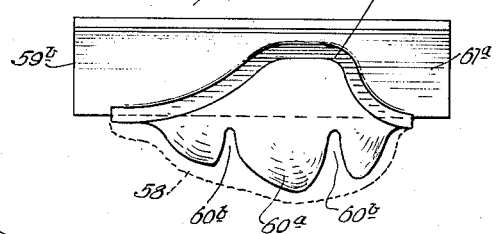
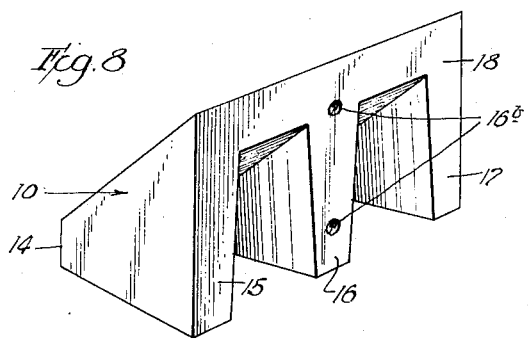
Inventor
Edwin H. Thoresen
by Albert Scheibli
Atty June 11, 1940.   E. H. THORESEN   2,204,263
MEANS FOR MANUFACTURING ORNAMENTAL CORNER PIECES
Filed Nov. 10, 1937   4 Sheets-Sheet 4
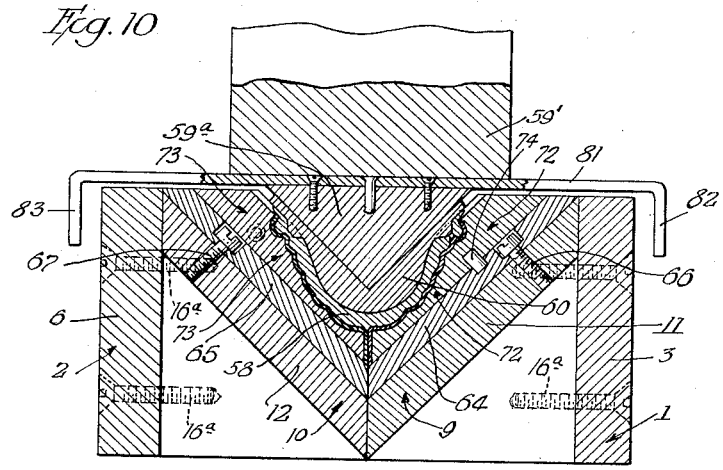
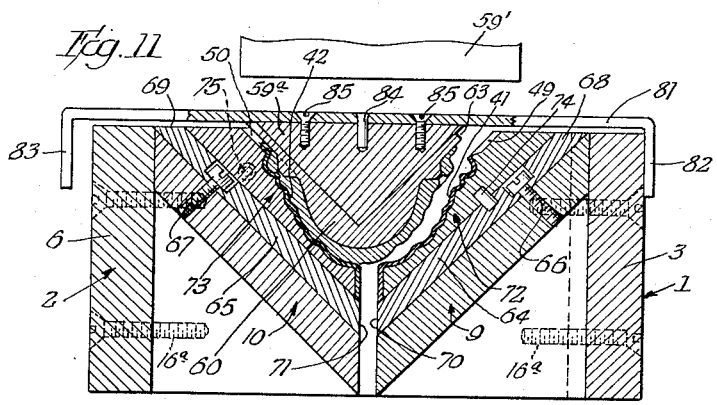
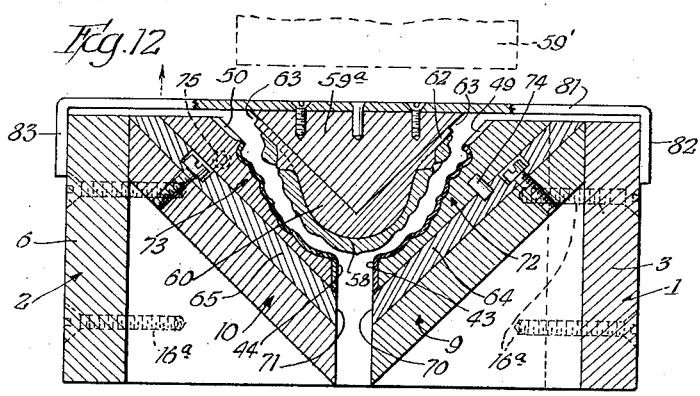
Inventor
Edwin H. Thoresen
by Albert Scheible
Atty.

Patented June 11, 1940

2,204,263

UNITED STATES PATENT OFFICE 2,204,263

MEANS FOR MANUFACTURING ORNAMENTAL CORNER PIECES

Edwin H. Thoresen, Chicago, Ill., assignor to William Thoresen Company, Chicago, Ill., a corporation of Illinois Application November 10, 1937, Serial No. 173,878

10 Claims. (Cl. 18—35)

The present invention relates to the making of corner elements, such as are applied to the corners of caskets or the like, and has reference more particularly to a means for molding such corner elements from plastic material, and especially such plastic materials as have the same or substantially the same physical characteristics as plastic wood pulp, or the like.

Heretofore, such corner pieces were generally of cast metal, and in some cases were of embossed sheet metal. In either event the making of them was expensive and involved many mechanical operations and apparatuses to effect the desired result.

By the present invention comparatively cheap and readily moldable light weight material is used without the necessity of any melting furnaces as when preparing molten metal, or stamping presses or the like as when making the corner pieces from sheet metal.

Among the objects of the invention is to provide a novel mold or molding machine which may be in the form of a holding frame having separable mold parts with inclined walls which slope down from the sides of the frame toward a central or medial vertical plane along which the mold parts are held together when molding or from which they are separated after the molding operation.

Upon the surfaces of these inclined walls are located, and preferably secured to such sloping mold parts, separable die parts also inclined in the same way and having the same parting or separating plane, the upper surfaces of the die parts having given or predetermined design contours against which the plastic blank is pressed to receive a counterpart impression which constitutes the surface design of the corner piece. These die parts are interchangeable for similar die parts having different surface designs.

In the illustrative embodiment the mold parts form a sort of rectangular frame or box-like structure within which the parts with the inclined or sloping walls are included, the mold parts having end walls which are so constructed and arranged that the end walls of one of the mold parts has slidable overlapping engagement with the end walls of the other of the mold parts. The end walls of one of the mold parts serve also to present end faces for the V-shaped space or channel between the sloping walls of the mold and die parts. These end walls, however, are not essential and may be omitted.

For the purpose of bringing the separable parts together and for holding them together when molding, and also for the purpose of separating the separable parts after the molding to release the pressed and compressed blank, the mold is provided with manually operable cam means at both ends of the mold structure. More particularly, the slidably overlapping end walls at each end of the mold structure are provided with vertically disposed oppositely facing channels in which vertically slides a block carrying a cam, in the form of an eccentric, on a shaft rotatably mounted in one of the overlapping walls. As the cam rotates it causes the mold parts to relatively slide either to separate the mold parts or to cause an approach thereof, depending on the direction of rotation of the cam. One of each pair of oppositely facing channels is wider than the other to permit the mold parts to slide, one with respect to the other, to the extent of the greater width of the wider channel. When the mold parts are together, that is, adjacently positioned at the medial separating plane, the cams are so shaped as to hold these mold parts locked in such position regardless of the tendency of the compressing member to separate them.

The invention comprehends the use of die means when producing the corner pieces from such material as wood pulp or the like, which impart the desired design effect on the surface of the corner piece blank. The die is made by electroplating a copper sheet or plating upon a master having a design contour counterpart to the design contour the corner piece is to receive, the master, in the illustrative case, being first of angular form but then parted or separated along the apex or vertex of the master, for separate copper electroplating. After the electroplates are obtained they are backed with backing plates of lead alloy by casting the alloy to electroplates. These constitute the die parts, in pair, which are then secured to the inclined or sloping walls of the mold parts with the lower ends of the die parts meeting in the medial plane of the mold as explained above.

In the process of producing the corner piece a thick sheet or piece of wood pulp or the like of suitable size may be bent to approximately the V-shape of the channel between the die parts so that the wings of this piece or blank will overlie the whole design contoured surface of the die or die parts when the blank is laid thereon. The piece is in a more or less plastic condition so that it may be readily strained to the desired shape and surface design when subjected to pressure. It may be made plastic by wetting it with water, oil or any other suitable liquid mixed or otherwise applied to the fibrous material of the blank. The blank need not be a bent piece but may be formed in angular form by the extrusion of the plastic material through an angular orifice or the like.

After placing this blank upon the die, the die parts being held together, the blank is pressed and compressed by a plunger acting against a pressing block generally having inclined or sloping faces forming a dihedral angle similar to the dihedral angle between the die parts so that the material of the blank will be pressed not only vertically downwardly but also at right angles to the surfaces of the die parts so that the material will be pressed into and partake of the configuration of the intaglio depressions in the die surfaces, some of the material (excess material) being squeezed out at the upper edges of the die parts. In cases where the corner pieces have rather extended prominences, such as bulbous parts, the pressing block has in addition core parts of the general shape or form of the prominences so as to act as cores in pressing the material to the die surfaces, thus making for a more uniform thickness of the article as also reducing the ultimate weight thereof and requiring less material.

The plunger is then raised, and the cams so operated as to unlock the mold parts and to cause them and the die parts, also, to separate for releasing the pressed and compressed blank. The movement of the mold and die parts is along a line at an acute angle, such as 45°, to the molding surfaces of the die parts, thus affording a freer draft of the configurated elements of the design than if the angular corner piece had to be drawn from between two surfaces, at an angle to each other, of a rigid non-separable die.

The invention also comprehends means for automatically separating or releasing the molded blank from die parts as the mold is opened after the compressing operation. This means, in the illustrative embodiment, is carried by the pressing block and has projecting parts which so cooperate with the mold parts upon the separation thereof that to whichever of the die parts the blank adheres, the projecting part cooperating with the mold part carrying the other die part will be engaged by the latter mold part as the die parts are separated, to thus positively release the blank from the die part to which it may adhere and leave the blank in mid position and free. After raising the pressing block the blank may be picked up and then dried.

Another object of the invention is to provide a novel corner piece of the character disclosed with reinforcing ribs or webs within the corner piece, especially those having prominences or deep molded portions, to strengthen the corner piece both when in molded plastic condition when drying and when securely attached to the corner of a casket or coffin or the like, and also to provide a novel core on the pressing block having suitable grooves or similar recesses within which the reinforcing ribs or webs are formed. The inner edges of these webs are preferably of the same angular form as the casket corner to which the corner piece is to be attached to afford firmness of connection without causing the corner piece to crack or the like.

Another feature is the provision of interchangeable cores of different forms, the inner side of each core being of the same shape or angular form as the lower end of the pressing block, that is, a dihedral angle, so that the core may fit therewith and be secured thereto as desired. In this the same pressing block may be used as when pressing relatively flat sides of angle pieces, as shown in Figs. 3 and 4, and with any number of different forms of cores, thus avoiding the great cost of and the space required for blocks, one block serving the general purpose, and the various cores, which are comparatively small, occupying less storage space as also being of less weight.

An advantage of the present invention is that it produces an integral single corner piece, requiring no separate forming and subsequent uniting of two parts for making up a corner piece as heretofore, thus greatly reducing the cost of labor and manipulation. It also allows ornamentations which would not draw out of the mold form if the latter were of single rigid piece. By thus producing the corner piece of generally approximately uniform thickness, the faces of the corner piece are also finished more uniformly during the pressing operation.

The blank is then dried and hardened, as in a drying oven or the like, and suitably coated as desired.

Other objects, advantages, capabilities, features, process steps, and the like are comprehended by the invention as will later appear and as are inherently possessed by the invention.

Referring to the drawings:

Fig. 3 is a vertical sectional view taken in a plane represented by line 3—3 in Fig. 1 of the drawings, showing the parts together and the compressing of the pulp blank;

Fig. 4 is a similar view taken in a plane represented by line 4—4 in Fig. 2 of the drawings, showing the parts separated after compressing, and the pulp blank released;

Fig. 5 is a perspective view of the mold when in closed condition, without the die parts;

Figs. 6 and 7 are fragmentary perspective views of the mold, when the mold is respectively in closed and in opening condition, and showing the function of the means for closing and for opening the mold;

Fig. 8 is a perspective view of a detail of the mold;

Fig. 9 is a fragmentary sectional view, on an enlarged scale, showing the means for slidably guiding the mold parts when opening and closing the mold;

Figs. 10, 11 and 12, are transverse sectional views in vertical planes of an alternative form of device showing the use of mold spacers for molding corner pieces of different widths, and also showing the use of cores with the pressing block for deep molding of prominent parts of the blank;

Fig. 14 is a side view of a pressing block designed to form reinforcing ribs or webs in the corner piece;

Fig. 15 is a fragmentary transverse sectional view, on an enlarged scale, of the mold, die and pressing parts using the pressing block shown in Fig. 14;

Fig. 16 is a fragmentary horizontal sectional view showing the reinforced corner piece applied to the corner of an object, such as a casket; and, Fig. 17 is a perspective view of a finished corner piece produced in accordance with the invention.

Figure 1:
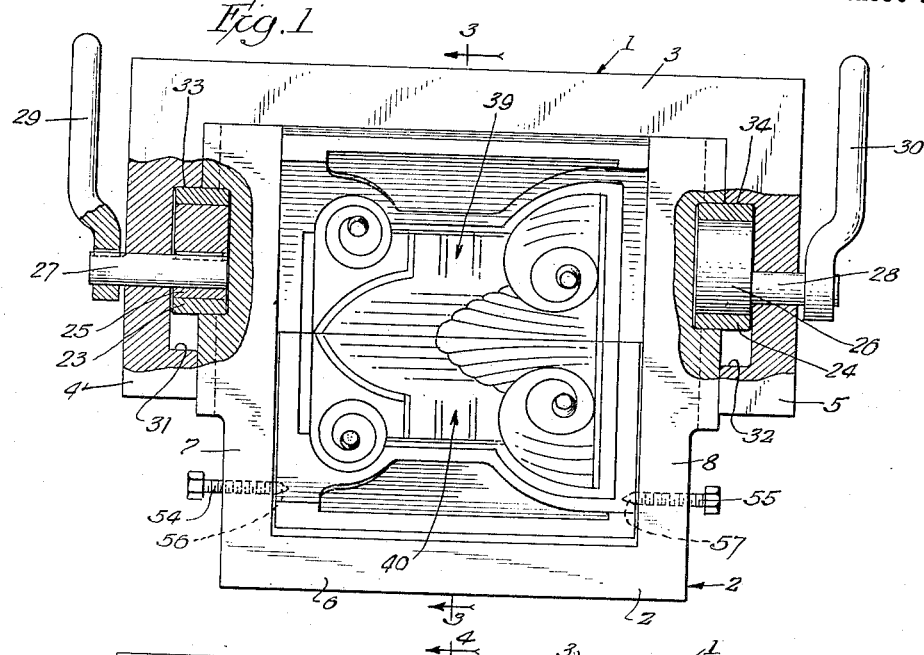
Fig. 1 is a top plan view of a mold and die means, with the separable parts together ready for forming the corner piece, constructed in accordance with the invention.

Referring more in detail to the drawings, the embodiments selected to illustrate the invention are shown in the form of a rectangular shaped mold comprising two mold parts 1 and 2 of which part 1 comprises a side wall 3 and end walls 4 and 5, and part 2 comprises a side wall 6 and end walls 7 and 8. These walls define a rectangular space within them.

Within this space are located two pieces or parts 9 and 10 each being in the general form of a triangular prism, and having inclined walls 11 and 12 which extend downwardly from the tops of the side walls 3 and 6 toward the center of the mold; the lower mitre ends 13 and 14 of the walls 11 and 12 terminating in a vertical plane which is the plane of separation or parting of the mold parts. Each inclined wall has integral upright supporting parts 15, 16, and 17 in the nature of pillars (Fig. 8), of which the pillars 15 and 17 constitute flat ends which lie flush with the inner faces of the end walls 7 and 8 of the mold part 2. The inclined wall mold parts 9 and 10 are preferably secured in any suitable manner, as by screws 16a passing through apertures in the side walls 3 and 6 of the mold frame and threaded into threaded apertures 16b in the pillar part 16 (see Fig. 8), so that the mold parts 9 and 10 will move with the mold frame parts when the mold parts are relatively moved. The upper ends of the walls 11 and 12 terminate in vertical faces 18 lying in the same vertical planes as the outer faces of the pillars, and these faces normally lie flush with the inner faces of the side walls 3 and 6 of the mold parts.

The end walls 4 and 5 respectively slidably overlap the end walls 7 and 8 (see Figs. 1, 2, 5, 6 and 7), the walls 7 and 8 having thickened portions in which are provided outwardly opening vertical channels 19 and 20 which oppositely face inwardly opening vertical channels 21 and 22 provided in overlapping walls 4 and 5, the channels 21 and 22 being wider than the channels 19 and 20 to allow for relative sliding movement of the mold part 1 along mold part 2.

In these channels are slidably located blocks 23 and 24 of a width to slidably fit in the channels 19 and 20 and of a thickness to extend across the depths of the oppositely facing channels 21 and 19, and 22 and 20, as is clear from Figs. 1, 2, 6, and 7. The blocks are suitably bored to receive cams 25 and 26 which in the illustrative embodiment are in the form of eccentrics keyed to shafts 27 and 28 rotatably supported or carried in the end walls 4 and 5, as shown. To the outwardly extending ends of the shafts 27 and 28 are secured, in any suitable manner, handles 29 and 30.

Figure 2:
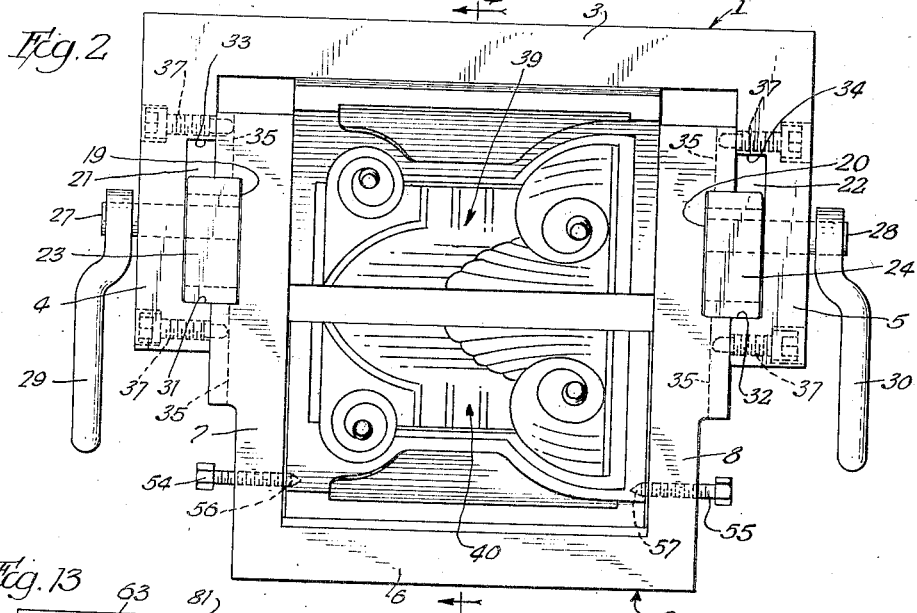
Fig. 2 is a similar view showing the parts separated to release the blank.
Figure 13:
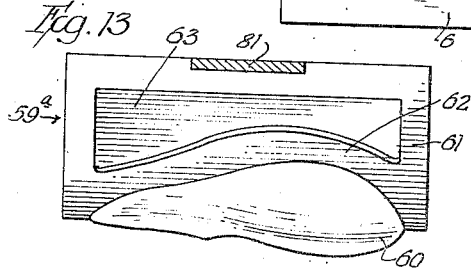
Fig. 13 is a side view of a pressing block using a core part.

When the handles 29 and 30 are turned, as from the position shown in Fig. 1 to that shown in Fig. 2, the shafts 27 and 28 and the cams 25 and 26 are rotated about the axes of the shafts 27 and 28 so as to cause a relative movement of the mold parts from the relation shown in Fig. 1 to that shown in Fig. 2, or, in other words, the mold is opened; the mold parts separated, so as to release the molded blank as later described. As the cams 25 and 26 turn in the blocks 23 and 24, the latter will have a vertical movement in the respective channels 19 and 20 in accommodation to the eccentric movement of the cams about the axes of the shafts 27 and 28. As shown, the channels 21 and 22 are wider than the channels 19 and 20 for permitting a relative sliding of the end walls 4 and 5 and walls 7 and 8, the sides or shoulders 31 and 32 of the channels 21 and 22 acting as limit stops against the cams 23 and 24 on the outward movement of the mold parts (see Fig. 2), and the sides or shoulders 33 and 34 of the channels 21 and 22 acting as limit stops against the cams 23 and 24 on the inward movement of the mold parts (see Fig. 1).

The mold parts are guided in their movements by means of pin and slot means in the end walls, this means serving to prevent any cocking of the parts during the relative sliding thereof. Each of the end walls 7 and 8 is provided with grooves or channels 35 (see Figs. 1, 2, 5, 6, 7, and 9) and each of the end walls 4 and 5 is provided with threaded bores 36 for receiving threaded pins 37 having smooth end portions 38 extending into the guide grooves 35. As the mold parts are relatively slid, these pin parts 38 slide in the grooves 35 and maintain the parts in proper relation so that there can be no cocking or the like.

The die parts 39 and 40 comprise design contoured copper electroplates 41 and 42 having mitre parts 43 and 44 which form the lower edges of the die parts 39 and 40 (see Figs. 3, 4, 10, 11, and 12) and which are in contact with each other on the medial plane of separation when the mold is in closed condition (see Figs. 3 and 10). These plates 41 and 42 are backed by cast in lead alloy or like backing plates 45 and 46 having border portions 47 and 48 in which are provided ways of escape 49 and 50 for the escape of excess material, and flash rims 51 and 52.

The die parts are made from a master of which the corner pieces, made in accordance with the present invention, are reproductions or replicas, by first producing a matrix by pressing the master in "black moulding," then producing a wax patrix from the master, then coating the patrix with metal bronze to form the cathode in the electrolyte bath when electroplating, and then copper plating the cathode in the bath, after which the contoured copper sheet is stripped from the patrix and becomes the die surface part of the die described above. The backing plate of lead alloy or the like is cast to the electroplate to form the die part described.

The die parts 39 and 40 are placed upon the inclined walls 11 and 12 of the mold with the mitre parts 43 and 44 in contact with each other and coincident with the vertical medial plane of the mold parts 1 and 2. The backing plate of one of the die parts, such as the plate 45 may have recesses to receive dowel pins 53 or the like fitted in suitable recesses provided in the inclined mold wall part, such as the wall 11 (Figs. 3 and 4). These are so located that when the die part is held in place by the dowel pins 53, the outer surface of the mitre portion 43 of the electroplate 42 will be exactly in the medial plane mentioned above. The other die part will rest on the inclined wall 12 with the mitre part 44 of the electroplate 41 in contact with the mitre part 43 of the electroplate 42 as shown in Fig. 3.

If the die part on the inclined wall 12 should not lie square with its companion on the wall 11, adjusting screws 54 and 55 are provided in the end walls 7 and 8 opposite the upper portion of the backing plate 46, the screws 54 and 55 having pointed ends 56 and 57 extending into conical recesses provided in the ends of the backing plate. By adjusting these screws the die part on the wall 12 will be canted or similarly adjusted so that the mitre portion 44 is made to fit evenly against the mitre portion 43. Moreover, these pointed ends of the screws serve to hold the die part from sliding down the inclined wall 12 when the mold parts are separated.

With the die parts 39 and 40 in closed condition, that is, adjacently positioned as shown in Figs. 1, 3, 5, 6, and 10, a sheet or piece 58 of wood pulp (or any other type of plastic material having substantially the same physical characteristics) in plastic condition and of generally the same angular form or shape as the die, is placed upon the die so as to lie upon and over the upper design contoured surfaces of the die parts 39 and 40. Then a compressing member or block 59, having its lower portion generally in the form of a dihedral angle, is forced against the upper or outer side of the blank 58 so as to squeeze it against the design contoured surfaces of the die parts to impart a counterpart design on the under surface of the blank and also to compress the blank into a compact rigid condition, some of the material of the blank squeezing out at the upper edges of the die parts to form flashes or the like which are later trimmed off. Pressure is applied to the block 59 by a plunger 59¹ or the like.

For compressing blanks against die parts where the contour does not vary widely, a pressing block 59 of the type shown in Figs. 3 and 4 is satisfactory. The pressure applying surfaces, in such case, of the pressing block may be flat or substantially so and the inside surfaces of the blank will be the same. The thickness of the compressed blank will not vary greatly. It may be generally said to be flat. But in cases where the desired contour includes prominences, such as rounded or bulbous portions, were a pressing block of the type shown in Figs. 3 and 4 used, the parts where the prominences occur would be very thick and heavy; a great amount of material being required. In order to obtain a blank of this kind with its walls running in thickness about the same throughout, I have provided a pressing block 59a shown in Figs. 10, 11, 12, and 13 having a core portion 60 adapted to extend deeper into the die and so press the material that the thickness of the blank will be more nearly even throughout. As shown the block 59a has inclined surfaces 61 forming a dihedral angle and along the ridge or apex is provided the core part 60. In the upper portions of the incline surfaces 61, above the flash rim 62 and where the blank is at the upper edges of the die parts, and where the pulp would squeeze out in the form of flashes or the like, the surfaces are cut away to provide shallow recesses or ways of escape 63 to afford free movement or passage of the excess material being squeezed beyond the rim 62. Thus with the type of die parts having deep portions, as shown in Figs. 10, 11, and 12, the pulp will be compressed by the core part 60 in the deep portion, and the remainder of the block 59a will press the material in the less deep portions of the die, with the result that much less material is used, a more nearly uniform thickness is obtained, and there is also a more nearly even compactness throughout.

In some cases when making deep pressed corner pieces, it is desirable to strengthen or reinforce the corner pieces, particularly to prevent the pieces bending or cracking either at the ridge or apex portions or the side portions of the pieces, especially at the juncture of the deep pressed portion and the shallow pressed portion. In Figs. 14, 15, and 16 is shown a pressing block 59b of wedge shape and with a core 60a having a border flange 62a, all seated upon the apical portion of the block 59b, the core 60a having transverse grooves or channels 60b in which the reinforcing ribs or webs 58a are formed when molding the blank 58, the bottoms of the channels 60b being of angular shape, as a right angle and parallel to and spaced from the flat surface portions 61a of the block 59b by the thickness of the border 62a of the core 60a, as along the dotted lines D in Fig. 15, so that the corner C of the casket C¹ will fit into the angular part of the reinforcing rib or web 58a as clearly shown in Fig. 16.

The invention also comprehends the provision of means for molding corner pieces with sides of different widths. As for example, Figs. 10, 11, and 12 show a mold for molding corner pieces with sides of less width than shown in Figs. 3 and 4. In such case, upon the inclined mold walls 11 and 12 are located auxiliary inclined walls 64 and 65 suitably secured to the walls 11 and 12 by screws 66 and 67 or the like as shown. The upper ends of the walls 64 and 65 may be beveled to present horizontal surfaces 68 and 69, and their lower ends are beveled to present vertical mitre faces 70 and 71 which, when the mold is closed, are in contact with each other and are in coincidence with the vertical medial parting plane of the mold, as shown in Fig. 10. The die parts 72 and 73, corresponding to the die parts 39 and 40 in Figs. 3 and 4, are located on these auxiliary walls 64 and 65, the die part 72 being held in proper place by dowel pins 74 corresponding to the dowel pins shown in Figs. 3 and 4, and the die part 73 being adjustably held in place by adjusting screws 75 corresponding to the screws 54 and 55 shown in Figs. 1 and 2. By this arrangement it will be seen that the upper edges of the die parts are brought nearer to each other and the lower edges thereof are higher so that there is a diagonal shortening, or in other words, the die parts are narrower and the blank will have narrower sides. In other respects the device is identical to that explained above in connection with the other figures of the drawings.

The molding parts are so designed as to provide countersinks at the points where the securing elements, such as screws 76 (see Fig. 16) pass through the sides of the piece to be fastened to the walls of the casket C₁. In such case the core part 60 or 60a is provided with conical projections 77 for molding a counterpart recess 78 (Figs. 15 and 16) and the die parts have also conical projections 79 opposite the projections 77 to provide countersinks in which the heads of the screws 76 are received (Fig. 16). The border portion 62a is disposed opposite the flash rim 52 so that as the pressing block is pressed against the blank the excess material exudes between the parts 62a and 52 more or less into the form of a flash, and escape of the excess is effected in the way of escape 50 provided in the backing plate and the space 80 between the flat face 61a of the block 59b and the escape way 50.

In operation, the mold die parts are located in position upon the incline walls 11 and 12 or upon the auxiliary walls 64 and 65. Then the mold parts are closed by turning the handles 29 and 30 whereby the lower end mitre faces of the inclined walls and of the die parts are brought together. If the die part 39 or 73 does not line up even with the die part 40 or 74, the adjusting screws are operated to produce even contact at the lower mitre surfaces. Then a piece of plastic material, such as wet pulp, which may be in sheet form, is bent, if desired but not necessary, into V-shape and is placed upon the die parts. The pressing block is then lowered in place into the generally V-shape cavity above the plastic mass or blank. Then the plunger 60 is lowered into contact with the top of the pressing block whereupon the pulp is squeezed, displaced, compressed and compacted between the designed contoured surfaces of the die parts and the surfaces of the pressing block, the excess pulp being squeezed out in the ways of escape mentioned. The plunger is then raised.

The next operation is to open the mold and to release the blank. Ordinarily, the blank will stick to either of the die parts so that when the mold parts are separated the blank and the pressing block extending into it will either move with the moving mold part in the case of the blank sticking to the die part 39 or 73, or will remain stationary with the stationary mold part in the case of the blank sticking to the die part 40 or 74.

The invention comprehends the provision of automatic means for releasing the blank from both die parts. Such means comprises a releasing bar 81 extending across the top of the pressing block and the mold and having downwardly extending fingers 82 and 83 at each side of the mold and normally spaced therefrom. The bar extends along a transverse channel provided in the top of the block 59 or 59a or 59b (see Fig. 13) and is centered by a pin 84 passing through a central aperture in the bar and fixed at a central point in the top part of the block. The bar may also be secured to the block by screws 85 or the like threaded into the top portion of the block.

In Figs. 10, 11, and 12 is shown the operation when the blank sticks to the die part carried by the moving mold part. Fig. 10 shows the mold in closed condition. When the mold is opened by turning the handles 29 and 30, which are turned in unison, the movable mold part 1 moves away from the stationary mold part 2 and carries with it the die part 40 or 73 together with the block 59 or 59a or 59b (as the case may be) and the bar 76 until the mold is opened half way, as shown in Fig. 11. At this instant the finger 82 engages the side 3 of the mold part 1 and stops moving, thus also holding the block and the blank stationary. Further movement of the mold part 2 and the die part 40 or 73 causes this die part to separate from the blank, the full open position being shown in Fig. 12, the blank and block being in mid position. In some cases the blank drops down from the block, and in other cases it sticks to the block. Then the block and bar are raised and the blank removed either from where it rests upon the die or from the block in the case when it sticks to the block. At full open position the wall 6 of the mold part may or may not merely just touch the finger 63.

In Figs. 3 and 4 is shown the operation when the blank sticks to the stationary mold part. In Fig. 3 the mold is shown in closed condition in full lines. When the mold part 1 moves to the dotted line position shown in Fig. 3, the blank sticks to the die part 39 or 73 and so the blank and the block as well as the bar 81 are held stationary. Further movement of the mold part 2 causes the wall 6 to engage the finger 83 and hence move the bar 81 with it. This causes the block to move also and the blank away from the die part 39 or 72. The full open position is shown in Fig. 4 where also the blank is shown to have dropped off of the block and lying on the die parts. The finger 82 may or may not just contact the wall 3. The block and bar are then raised and the blank removed as before.

When the blank is first placed upon the die and the block located in position, the latter will self center itself as the plunger is lowered by reason of the inclined surfaces of the block and of the die parts being generally parallel so that as the block is forced down it will, if off center, shift and seek its central position before the compressing force takes full effect. In this way the fingers will always be equally spaced from the side walls of the mold before the opening operation of the mold.

While I have herein described and upon the drawings shown an illustrative embodiment of the invention and a method of carrying out the invention, it is to be understood that this invention is not limited thereto but comprehends other constructions, details, arrangements of parts, features, process steps, and the like without departing from the spirit of the invention.

Having thus disclosed the invention, I claim:

1. A molding section of a molding machine for forming corner pieces of plastic material with a given contoured design surface form with spaced vertical side and end walls, said section being of generally rectangular form and comprising separable section parts divided in a central longitudinal vertical plane, each part having an inclined bottom wall extending downwardly from a side thereof to said dividing plane so as to form a dihedral angle between said inclined walls of said parts when said parts are adjacently located at said dividing plane and at least one of said section parts having end walls for closing the ends of the space of said angle, and a two part die divided by said plane and generally forming a dihedral angle so as to seat upon said inclined walls, the upper surfaces of said die parts being contoured with a given design to impart a counterpart design on the outer surfaces of an angular blank of plastic material pressed against said contoured die parts.

2. A molding section as per claim 1, in which the end walls of a section part slidably overlap the end walls of the other section part.

3. A molding section as per claim 1, in which the end walls of a section part slidably overlap the end walls of the other section part, and means associated with said overlapping walls to normally hold said die and section parts together when pressing the blank against the die parts and for separating the section and die parts to release the blank therefrom.

4. A molding section as per claim 1, in which the end walls of a section part slidably overlap the end walls of the other section part, the end walls of one of said parts having cam channels, and cams rotatably carried by the end walls of the other part and operatively located in said channels for effecting separation or approach of said parts upon rotation of said cams.

5. A molding section as per claim 1, in which the end walls of a section part slidably overlap the end walls of the other section part, said overlapping walls having oppositely facing channels, slidable blocks in the facing channels, cams rotatably carried by the overlapping walls of one of said mold parts and extending into said blocks for sliding said blocks along said channels when rotating the cams and for effecting separation or approach of said parts.

6. A molding section of a molding machine for forming corner pieces from wood pulp, comprising separable section parts having upright spaced end and side walls and inclined walls extending downwardly between said end walls and from the tops of the side walls and abutting in a vertical plane of separation for the section parts, die parts located on said inclined walls between said end walls and having their lower edges in said plane of separation when said section parts are together, means for holding said die parts in place on said inclined walls, said die parts being disposed at an angle to each other to provide a V-shaped cavity therebetween and above the lower meeting edges thereof, the upper surfaces of said die parts being contoured to a predetermined design to impart a counterpart design on the surface of an angular blank of plastic material when pressed against said contoured die surfaces.

7. A molding section as per claim 6, wherein one of the holding means for a die part is adjustable for adjusting the relation of a die part to aline the lower edge thereof even with the lower edge of the companion die part.

8. A molding section of a molding machine for forming corner pieces from wood pulp, comprising separable section parts having upright spaced end and side walls and inclined walls extending downwardly between said end walls and from the tops of the side walls and abutting in a vertical plane of separation for the section parts, inclined auxiliary walls located between said end walls and on said first mentioned inclined walls and having their lower edges meeting in said plane of separation, die parts located between said end walls and on said inclined auxiliary walls and having their lower edges in said plane of separation when said section parts are together, means for holding said die parts in place on said auxiliary walls, said die parts being disposed at an angle to each other to provide a V-shaped cavity therebetween and between said end walls and above the lower meeting edges thereof, the upper surfaces of said die parts being contoured to a predetermined design to impart a counterpart design on the surface of an angular blank of plastic material when pressed against said contoured die surfaces.

9. A molding machine for forming angle-shaped pieces, comprising a molding section and a pressing block which are relatively movable in a vertical direction, said molding section comprising component parts which have side and end walls and which are relatively movable in a horizontal direction, said component parts having oppositely inclined wall portions within said walls the lower ends of which abut in a vertical plane when said component parts are in abutting relation and which form therebetween a V-shaped recess, mold plates located on said inclined wall portions in inclined position with the lower edges of the mold plates in abutting relation in said vertical plane when said component parts are in abutting relation, said pressing block having a core element of generally V-shaped cross sectional form for entry into said recess and to mold a blank of material between said core element and said mold plates.

10. A molding machine for forming angle-shaped pieces, comprising a molding section and a pressing block which are relatively movable in a vertical direction, said molding section comprising component parts which have side and end walls and which are relatively movable in a horizontal direction, said component parts having oppositely inclined wall portions within said walls the lower ends of which abut in a vertical plane when said component parts are in abutting relation and which form therebetween a V-shaped recess, mold plates located on said inclined wall portions in inclined position with the lower edges of the mold plates in abutting relation in said vertical plane when said component parts are in abutting relation, said pressing block having a core element of generally V-shaped cross sectional form for entry into said recess and to mold a blank of material between said core element and said mold plates, and interengaging means on said component parts for causing a relative movement of the component parts to either separate the parts to release the molded piece or to abut said parts and hold the parts in abutment during the molding operation.

EDWIN H. THORESEN.